United States Patent
Millet et al.

(10) Patent No.: US 6,434,627 B1
(45) Date of Patent: Aug. 13, 2002

(54) IP NETWORK FOR ACCOMODATING MOBILE USERS WITH INCOMPATIBLE NETWORK ADDRESSING

(75) Inventors: Mark E. Millet, Mountain View; Chi-Shing Ng, San Jose, both of CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/268,559

(22) Filed: Mar. 15, 1999

(51) Int. Cl.[7] ............................................. G06F 15/16
(52) U.S. Cl. ..................... 709/245; 709/217; 709/235; 709/249; 370/392; 370/401; 713/153; 713/201
(58) Field of Search .................. 703/201–203, 703/217–218, 223, 227, 238–239, 245, 246, 249, 250; 713/200–202, 152–153, 160–161; 370/253, 351–356, 392–393, 401

(56) References Cited

U.S. PATENT DOCUMENTS

| | | | |
|---|---|---|---|
| 4,962,532 A | | 10/1990 | Kasiraj et al. ............... 713/201 |
| 5,159,592 A | | 10/1992 | Perkins ........................ 370/401 |
| 5,287,103 A | | 2/1994 | Kasprzyk et al. ...... 340/825.52 |
| 5,371,852 A | | 12/1994 | Attanasio et al. ........... 709/245 |
| 5,430,715 A | | 7/1995 | Corbalis et al. ............ 370/392 |
| 5,477,531 A | | 12/1995 | McKee et al. .............. 370/249 |
| 5,513,337 A | | 4/1996 | Gillespie et al. ............ 713/200 |
| 5,526,489 A | * | 6/1996 | Nilakantan et al. ......... 709/245 |
| 5,550,984 A | | 8/1996 | Gelb ........................... 709/245 |
| 5,622,601 A | | 4/1997 | Vu .............................. 713/201 |
| 5,734,865 A | * | 3/1998 | Yu .............................. 709/250 |
| 5,774,660 A | * | 6/1998 | Brendel et al. ............. 709/201 |
| 6,079,020 A | * | 6/2000 | Liu ............................. 713/201 |
| 6,141,690 A | * | 10/2000 | Weiman ...................... 709/245 |
| 6,173,312 B1 | * | 1/2001 | Atarashi et al. ............ 709/203 |
| 6,195,706 B1 | * | 2/2001 | Scott .......................... 709/245 |
| 6,295,276 B1 | * | 9/2001 | Datta et al. ................. 709/238 |

OTHER PUBLICATIONS

Y. Reckhter. B. Moskowitz, D. Karrenberg, and G. de Groot. "Address Allocation for Private Internets." RFC 1597. T.J. Watson Research Center, IBM Corp., Chrysler Corp., RIPE NCC. Mar. 1994.

K. Egevang and P. Francis. "The IP Network Address Translator (NAT)." RFC 1631. Cray Communications. NTT. May, 1994.

* cited by examiner

Primary Examiner—Bharat Barot
(74) Attorney, Agent, or Firm—Beyer Weaver & Thomas, LLP (57) ABSTRACT

An flexible address translation method allows a computer network to automatically learn that a visiting node has attached and then automatically establish a virtual gateway so that the visiting node can communicate through the network with local nodes, other visiting nodes, and/or Internet sites. The network performs an address translation to enable the connectivity of the visiting node. The network maintains one or more globally unique outside addresses that point to it. In other words, packets addressed to the one or more outside addresses are routed to the network. When a visiting node connects to the network, the network translates the source address of packets from the node to a particular one of its outside addresses. The network also replaces destination addresses in packets received by the network that are addressed to the particular outside address. Specifically, the network replaces the globally unique outside address with the "home" address of the visiting node. Thereafter, the packet is forwarded to the visiting node, which is now connected to the network.

29 Claims, 9 Drawing Sheets

| Inside IP Addr. (source) | Inside MAC Addr. (source) | Inside MAC Addr. (destination) | Destin. IP Addr. | Outside IP Addr. (source) | Outside MAC Addr. (source) | Outside MAC Addr. (destination) |
|---|---|---|---|---|---|---|
| 24.10.31.8 | aaaa.bbbb.cccc | 0000.1111.2222 | 172.21.0.3 | 15.21.21.35 | 0000.1111.3333 | 2222.0000.aaaa |
| 33.9.53.192 | yyyy.gggg.dddd | 1155.0000.3545 | 99.0.103.16 | 15.21.21.37 | 0000.1111.3333 | 2222.0000.aaaa |
| 24.10.31.15 | aaaa.bcbc.efde | 0000.1111.2222 | 172.21.0.3 | 15.21.21.19 | 0000.1111.3333 | 2222.0000.aaaa |

IP NETWORK FOR ACCOMODATING MOBILE USERS WITH INCOMPATIBLE NETWORK ADDRESSING

BACKGROUND OF THE INVENTION

The present invention relates to networks that can accommodate a wide variety of mobile nodes (e.g. laptop computers). More specifically, the invention relates to address translation systems for mapping IP addresses of the mobile nodes to globally unique IP addresses available on a network where mobile nodes temporarily attach.

Private networks are commonly connected to the Internet through one or more routers so that hosts (PCs or other arbitrary network entities) on the private network can communicate with nodes on the Internet. Typically, the host will send packets to locations both within its private network and on the Internet. To receive packets from the Internet, a private network or a host on that network must have a globally unique 32-bit IP address (or, if necessary, a larger address as specified in IP version 6). Each such IP address has a four octet format. Typically, humans communicate IP addresses in a dotted decimal format, with each octet written as a decimal integer separated from other octets by decimal points.

Global IP addresses are issued to enterprises by a central authority known as the Internet Assigned Number Authority ("IANA"). The IANA issues such addresses in one of three commonly used classes. Class A IP addresses employ their first octet as a "netid" and their remaining three octets as a "hostid." The netid identifies the enterprise network and the hostid identifies a particular host on that network. As three octets are available for specifying a host, an enterprise having class A addresses has $2^{24}$ (nearly 17 million) addresses at its disposal for use with possible hosts. Thus, even the largest companies vastly under use available class A addresses. Not surprisingly, Class A addresses are issued to only very large entities. Class B addresses employ their first two octets to identify a network (netid) and their second two octets to identify a host (hostid). Thus, an enterprise having class B addresses can use those addresses on approximately 64,000 hosts. Finally, class C addresses employ their first three octets as a netid and their last octet as a hostid. Only 254 host addresses are available to enterprises having a single class C netid.

With increasing frequency people travel, for business and pleasure, with portable computers. Laptop computers have become ubiquitous in the work force. In an effort to become ever more productive, individuals travel with these tools so that they can work essentially anywhere. Often work requires that the individual access the Internet. Even if their work does not require this, many individuals wish to remain in communication with their colleagues via the Internet.

Many enterprises would like to accommodate this propensity by allowing all customers or visitors to use their own computers to access the Internet while they visit the enterprise. Examples of such enterprises include hotels, airport kiosks, hospitals, etc.

If a user desires to take a computer that is normally attached to a home network and travel with it so that it attaches to a different, remote, network, the node cannot automatically communicate over the remote network. First, the mobile node is usually configured to send messages through a specified router at its home network. Because it is no longer present at the home network and the specified router cannot be immediately located, communications from the mobile node will not be sent by the remote network. In addition, communications to the mobile node will be routed to the node's home network. Because the router there will not know where to forward the packet, the communications will be lost.

To allow remote connections, some mobile computers use Dynamic Host Configuration Protocol (DHCP), which is described in RFC 2131, incorporated herein by reference for all purposes. In this protocol, the computer is told to ask the network —according to prescribed rules—for a temporary network address. Thus, DHCP allows mobile nodes to connect to the Internet via remote networks. From the perspective of a hotel or other entity wishing to provide Internet access to all visitors, this is well and good so long as all visiting nodes are configured to work within the DHCP protocol. Unfortunately, this is not the case. Many computer users, who have traditionally been stationary users, have obtained mobile computers and now travel with these machines. Many such users are not even aware of DHCP. Thus, if a hotel is to rely on DHCP for the connectivity of its visitors, many of its visitors will not be able to easily connect.

There are alternative, more universally applicable, possibilities. If the visiting node has a statically configured IP address, that IP address can be adjusted. Conventional computer operating systems such as Windows 95®, Windows 98®, Windows NT®, Macintosh® OS etc. have a setting in which the user can choose a new IP address or set the computer to dynamically take on an IP address assigned by the new network. Thus, a computer can have its IP address reset to be compatible with a remote network. The problem with this approach is that the cost of reconfiguring the IP address (it is not a trivial procedure) in a remote computer exceeds the advantage to the enterprise providing the remote network connection. Further, when the computer moves back to its home network (or to some other network), it must again have its IP address reset via the complicated procedure. Except in the rare case of an unusually sophisticated user, at least two adept persons other than the computer user must be involved in cycling the computer from its home IP address to a remote IP address and back again.

Alternatively, a remote network configured with a Network Address Translation (or "NAT") could be reconfigured to accommodate the visiting node. However, this will require a highly sophisticated network administrator, in communication with the visitor at her computer, resetting the remote network's list of available "inside addresses" for address translation. This approach is even less cost effective than setting and resetting the static IP address of the visiting node.

Figure 1A:
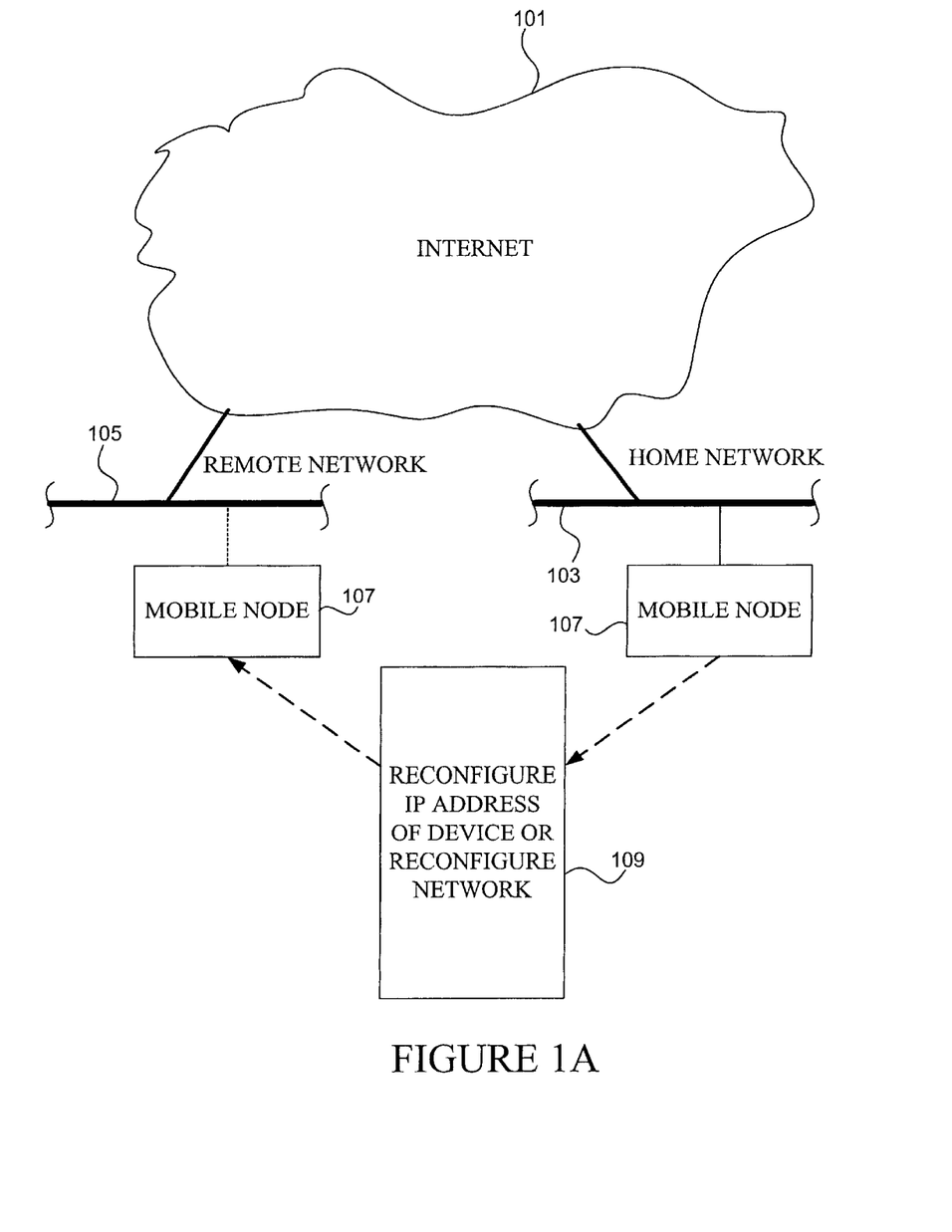
FIG. 1A is a diagram illustrating a home network and a remote network and a method whereby a mobile node normally based at the home network may connect with a remote network, using conventional procedures.

FIG. 1A illustrates the general-purpose currently available approaches to network connectivity for a statically configured laptop or other mobile node. As illustrated, the Internet 101 allows nodes on a home network 103 to communicate with nodes on a remote network 105. In this specific example, a node 107 having a static IP address is normally connected to home network 103. In other words, network 103 is the home network for mobile node 107.

Under some circumstances, mobile node 107 migrates from its home network 103 to the remote network 105. This is illustrated by the dashed arrows in the figure. In one example, home network 103 is the enterprise network for an employer that owns node 107 and remote network 105 is a network of a hotel where the owner of node 107 visits.

In order for node 107 to have network conductivity at remote network 105, either it or network 105 must undergo some transformation. A process block 109 illustrates this transformation. As indicated, the static IP address of node 107 may be reconfigured or a network address translation component of remote network 105 must be reconfigured. As pointed out, both of these options fail to allow a convenient and easy connection.

In view of the above, it has become apparent to the inventors that hotels and other entities desiring to provide network connectivity for their visitors require an improved technique for providing that connectivity to the heterogeneous collection of visiting computers that they might encounter.

SUMMARY OF THE INVENTION

The present invention provides systems and methods that allow a computer network to automatically learn that a visiting node has attached and then automatically establish a virtual gateway so that the visiting node can communicate through the network with local nodes, other visiting nodes, and/or Internet sites. The network preferably performs an address translation to enable the connectivity of the visiting node. Specifically, the network maintains one or more globally unique outside addresses that point to it. In other words, packets addressed to the outside addresses are routed to the network. When a visiting node connects to the network, the network translates the source address of packets from the node to a particular one of its outside addresses. The network also replaces destination addresses in packets received by the network that are addressed to the particular outside address. Specifically, the network replaces the globally unique outside address with the "home" address of the visiting node. It then forwards the packet to the visiting node. Note that the network may be capable of handling any type of visiting node, regardless of its address or home network.

One aspect of the invention relates to a method of providing network connections for visiting nodes at a remote network (e.g., a network at a hotel), with the visiting nodes being configured to connect through a home network that is remote from the remote network. Such method may be characterized as including the following: (a) establishing a virtual gateway for a visiting node, which virtual gateway behaves as the home default gateway for the visiting node; and (b) in a packet received at the virtual gateway, switching a home IP address of the visiting node with a globally unique outside address provided by the remote network.

The virtual gateway may be established by sending a default gateway packet to the visiting node. The default gateway packet indicates that the remote network can handle Internet traffic from the visiting node. Preferably, the default gateway packet identifies a gateway node on the remote network that is configured to act as virtual gateway. In a specific embodiment, the default gateway packet is a reply to a default gateway ARP (Address Resolution Protocol) packet sent by the visiting node.

Switching the home IP address with a globally unique outside address can take place on both in-bound and out-bound packets. When a packet is sent from the visiting node, the source IP address of such packets is replaced with the globally unique outside address. The system will then forward the packet to the appropriate destination on the Internet. When a packet is sent from an Internet node to the visiting node (as identified by the globally unique outside address the destination IP address), the destination IP address of the packet is replaced with the home IP address of the visiting node.

During a given session a global IP address should be used consistently. Thus, an address is selected for a given visiting node and temporarily assigned to that node—usually for at least the duration of a session (e.g., during the lifetime of a TCP connection). To preserve the association of the visiting node's home address and the globally unique address during the session, the remote network may create a translation entry specifying the home IP address of the visiting node and the globally unique outside address. In addition to the visiting node's home address and the associated globally unique address, a translation entry may include an Internet destination IP address and source and destination MAC addresses. Preferably, the translation entry is provided with other entries in the form of an address translation table. When a packet is received from an outside or inside source, the remote network may check its list of translation entries to identify the home IP address of the visiting node and the globally unique outside address.

In addition, to providing a virtual gateway, the remote network may provide a virtual name server for Domain Name System (DNS) requests. To do so, it must first determine that the visiting node has made a Domain Name System request addressed to a home name server that is not on the remote network. It may then redirect the DNS request to a remote name server to which the remote network is configured to submit such requests. In this manner, the visiting node receives DNS service transparently, even though its home name server may be inaccessible from the remote network.

Another aspect of the invention provides an apparatus configured to provide network connections for visiting nodes at a remote network. The apparatus may be characterized by the following features: (a) one or more processors; (b) a memory in communication with at least one of the processors; and (c) an address translation list (e.g., an address translation table) including one or more translation entries, each specifying a home IP address of the visiting node and a globally unique outside address. In this apparatus, at least one of the processors, possibly in conjunction with the memory, is configured or designed to act as a virtual gateway for a visiting node, which virtual gateway behaves as the home default gateway for the visiting node. The virtual gateway may send default gateway packets (such as replies to default gateway ARPs) in the manner described above. Further, the processor may be configured to redirect DNS requests from the visiting node to a local name server as described above.

Configuring the processor(s) and/or memory to perform the functions described above may be accomplished with an operating system running on the network device. Alternatively, some or all of these functions may be programmed by an application that runs on the operating system. Still further, the hardware may be specially designed to perform these functions. Preferably, the apparatus, including the processor and memory, is a router or other network device on the remote network. This allows the device to simulate the home router or gateway of visiting nodes connecting to the network. In principle, there is no reason why the systems of this invention can not run on other devices such as firewalls or other appropriately configured network nodes.

Another aspect of the invention relates to program products that include a machine-readable medium on which are stored instructions for performing methods of this invention. Such program products may also store address translation lists (e.g., tables) that can be used with this invention.

These and other features and advantages of the present invention will be presented in more detail in the following specification of the invention and the associated figures.

DESCRIPTION OF THE PREFERRED EMBODIMENTS

Figure 1B:
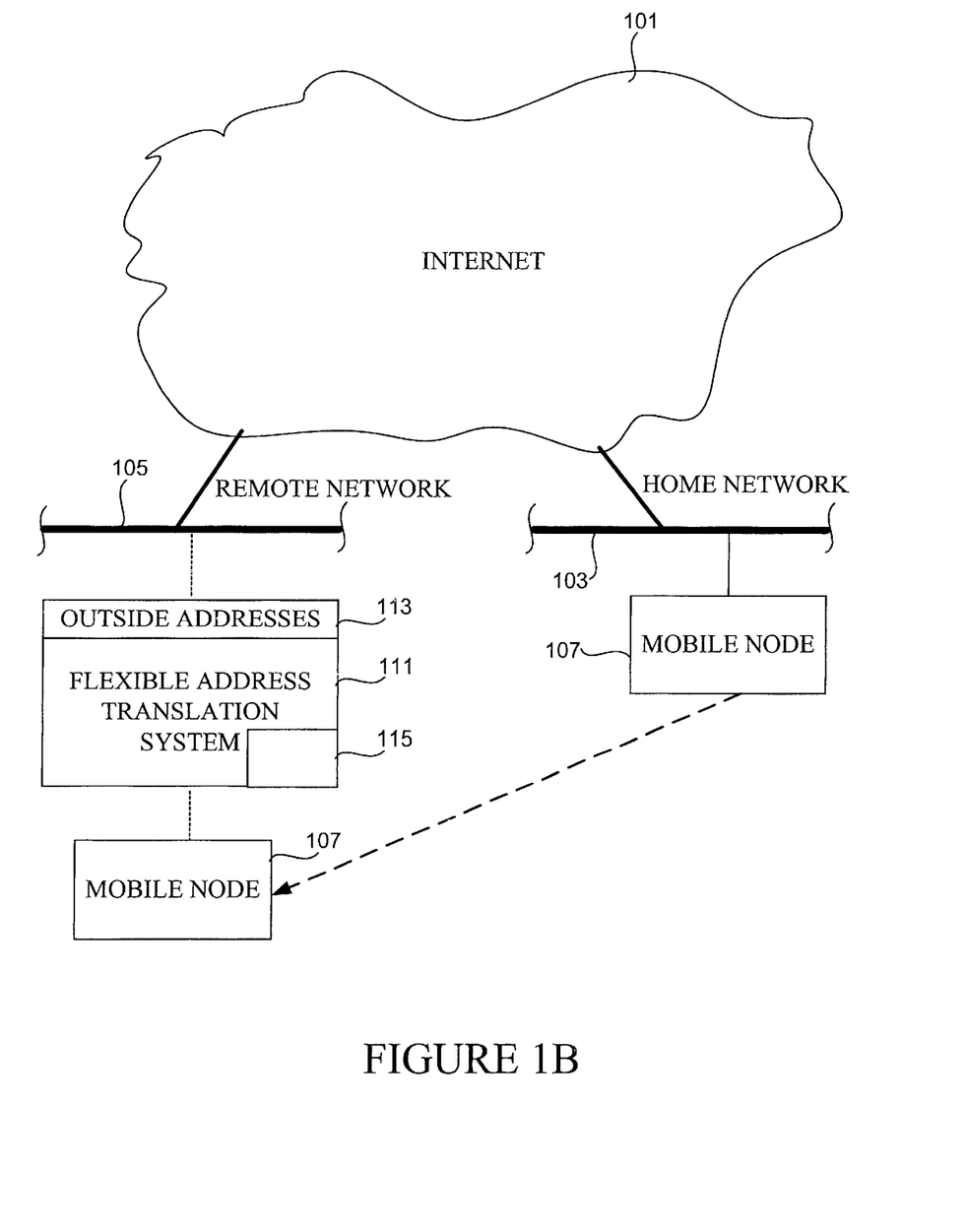
FIG. 1B is a diagram illustrating a home network and a remote network and a method whereby a mobile node normally based at the home network may connect with a remote network, using procedures of this invention.

FIG. 1B is an illustration depicting how a mobile node may connect to a foreign network employing a flexible address translation system in accordance with one embodiment of this invention. For comparison, this figure includes many of the same features illustrated in FIG. 11A. Home network 103 and foreign network 105 both have connections to the Internet 101, for example. In addition mobile node 107, normally based at home network 103, is transported to another location where it is proximate to foreign network 105. Assume that someone wishes to use mobile node 107 to communicate via the Internet while visiting an enterprise associated with foreign network 105. To allow this foreign network 105 includes a flexible address translation system 111. As illustrated mobile node 107 connects to foreign network 105 through flexible address translation system 111.

Address translation system 111 includes a pool of outside addresses 113 which it advertises to the outside world. Address translation system 111 also maintains a translation table 115 specifying mapping between specific outside addresses and the local addresses of nodes connected through it (e.g., visiting node 107). Packets arriving at foreign network 105 and addressed to one of the outside addresses in pool 113 are correctly routed to visiting nodes based upon the items in translation table 115. Address translation system 111 replaces the source addresses on packets from visiting node 107 with a particular outside address specified in table 115. This process is described in more detail below in connection with the discussion of FIGS. 2A and 2B.

In one preferred embodiment, a flexible address translation system of this invention behaves similarly, in some regards, to a conventional network address translation system. A Network Address Translation ("NAT") protocol was described by K. Egevang and P. Francis in "The IP Network Address Translator (NAT)," RFC 1631, Cray Communications, NTT, May 1994 which is incorporated herein by reference for all purposes. A NAT system with a firewall is also described in U.S. Pat. No. 5,793,763 issued to Mayes et al. on Aug. 11, 1998, assigned to the assignee of the present invention, and incorporated herein by reference for all purposes. NAT is based on the concept of address reuse by private networks and operates by mapping the reusable IP addresses of the leaf domain ("inside addresses") to the globally unique ones ("outside addresses") required for communication with hosts on the Internet. In implementation, a local host wishing to access the Internet receives a temporary IP address from a pool of such globally unique addresses available to the enterprise (e.g., class C, 254 addresses). While the host is sending and receiving packets on the Internet, it has a global IP address that is unavailable to any other host. After the host disconnects from the Internet, the enterprise takes back its global IP address and makes it available to other hosts wishing to access outside networks.

Figure 2A:
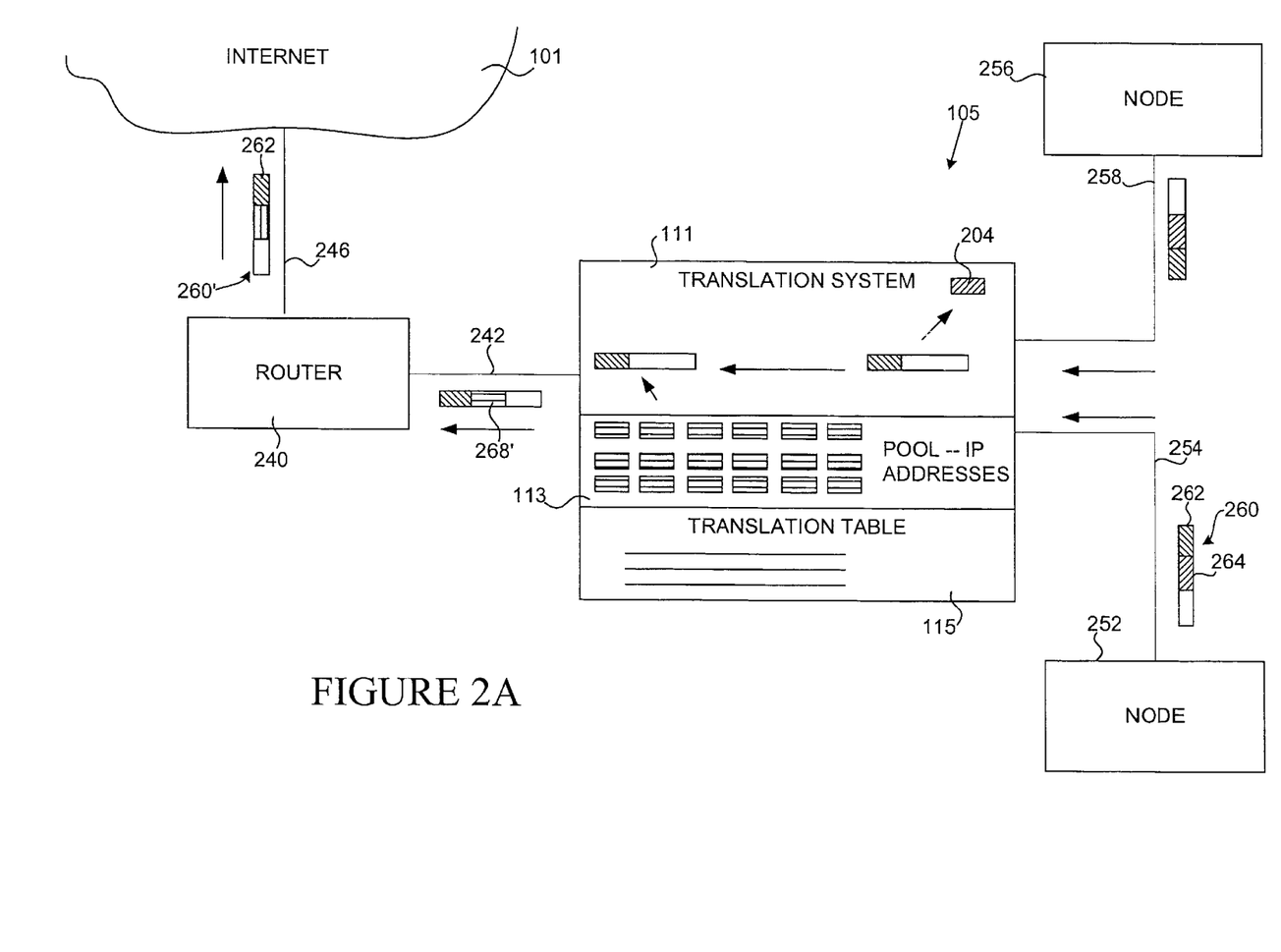
FIG. 2A is a schematic illustration showing how a flexible address translation system of this invention may translate addresses on packets leaving its network.

FIG. 2A further illustrates the operation of a flexible address translation system 111 of the present invention. Translation system 111 serves as part of enterprise remote network 105. On the enterprise side, translation system 111 serves as a network router linked to various nodes on the enterprise network 105 including a node 252 via line 254 (e.g., a network cable or a wireless link) and node 256 via line 258. One or both of these nodes may be a mobile node having a base network elsewhere. On the Internet side, translation system 111 connects to an Internet router 240 via a communications connection 242. Internet router 240, in turn, connects to Internet destinations 101 through a communications connection 246.

As an example, assume that node 252 prepares a message to a destination on Internet 101. The IP facilities of node 252 will divide the message into packets, including a packet 260, each having a destination IP address 262 specifying the Internet destination. Each packet will also include a source IP address 264 configured for node 252. Note that source and destination IP addresses reside at defined locations within a packet's header.

In this example, assume that node 252 is a visiting node having a home base elsewhere. Therefore, it is configured with an IP address appropriate for its home network but not for remote network 105. Specifically, the Internet will route packets addressed to node 252 to its home network, regardless of whether node 252 is connected to remote network 105. To remedy this problem, translation system 111 maintains a pool of "outside" IP addresses 113, which the Internet understands to belong to network 105.

When translation system 111 receives packet 260 from node 252, it replaces source IP address 264—associated with the home network of node 252—with an outside IP address 268 from pool 113. Then translation system 111 directs packet 260 to router 240. From there, router 240 sends the packet to the Internet 101 where it is routed to its destination. Pool 113 may include all or some subset of the global IP source addresses allocated to enterprise network 105.

Figure 2B:
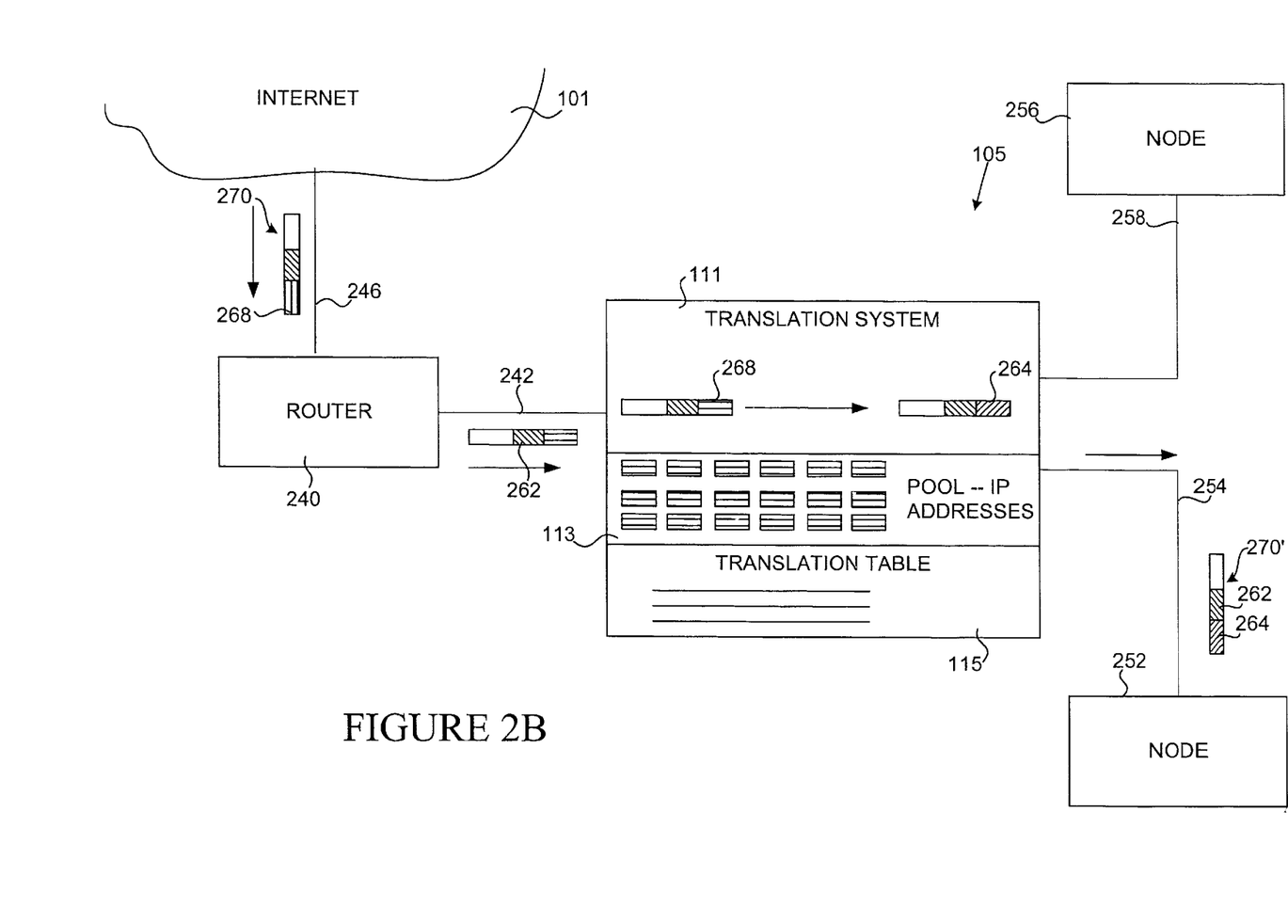
FIG. 2B is a schematic illustration showing how a flexible address translation system of this invention may translate addresses on packets received at its network.

As illustrated in FIG. 2B, an Internet site can reply with a packet 270 of its own destined for global IP address 268. Upon receipt of such packet, translation system 111 may determine if it presents a security risk (assuming that system 111 is configured to act as a firewall). Regardless, it will review translation table 115 to identify IP address 268 as linked to node 252. It will then replace destination address 268 on the inbound packet with the local address of node 252 (address 264) and then forward the modified packet to node 252. Depending upon the network protocol, node 252 may continue sending packets to (and receiving packets from) the Internet site during UDP or TCP session, for example. After the node 252 finishes its Internet session, address 268 may be made available to other nodes desiring Internet access.

Translation table 115 includes information needed to allow the translation of the visiting node's IP address (inside address) to a globally unique address of the remote network (outside address). Various pieces of information may be necessary for the translation and for the virtual default gateway. This information may be provided in various tables or lists stored in the network device. For example, the information may be stored in a Network Address Translation table, a routing table, and/or an ARP table.

Figure 3:
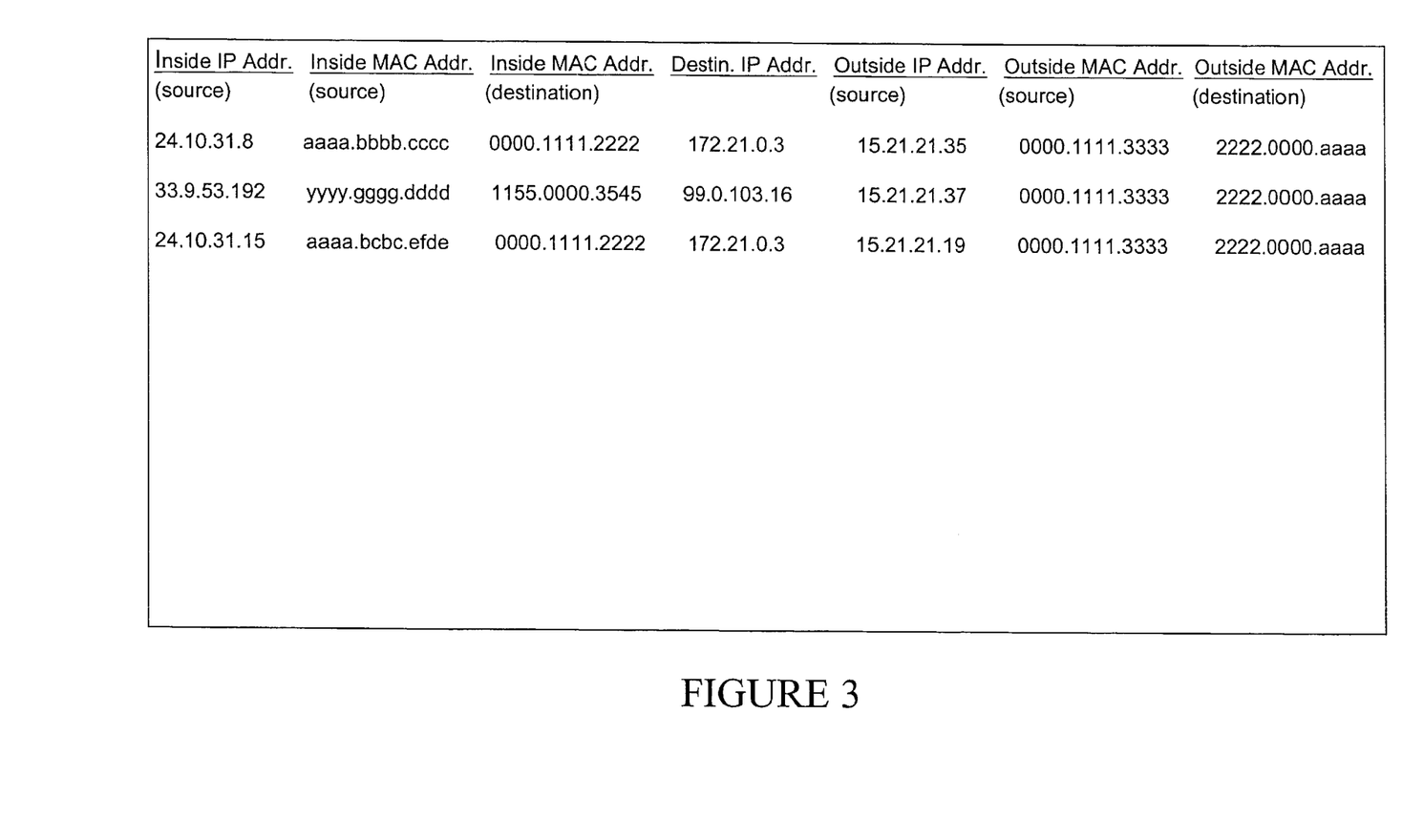
FIG. 3 is a representation of address translation information that may appear in one or more tables in accordance with one embodiment of this invention.

A sample translation table is illustrated in FIG. 3. This table is primarily a conceptual or logical representation of tabular information that may be used in the address translation methods of this invention. As shown there, table 115 includes various entries (depicted as rows), each specifying a particular connection for a particular visiting node. Of interest, table 115 includes an "Inside IP Address" and an "Outside IP Address" for each entry. These might be stored in a device's NAT table, for example. When the system 111 encounters an out-bound packet having a source IP address matching an Inside IP Address of one of the entries in table 115, it will switch the source IP address of the packet to the entry's Outside IP Address provided in the table. Similarly, when system 111 encounters an inbound packet having a source address matching a table entry's Outside IP Address, the system will forward that packet to the visiting node identified by the entry. Table 115 includes other attributes that will be discussed in more detail below.

A traditional Network Address Translation system typically acts on a pool of known "inside" addresses from an address space comprised of the class B or class C IP addresses held by a local network. Thus, the system is configured to handle only those packets having source or destination addresses from a limited known pool. When it receives such packets, it translates the known inside address to an appropriate "outside" address selected from a pool of globally unique outside addresses.

Systems of the present invention must handle addresses from a far greater range of "inside" addresses. These addresses include potentially any globally unique IP address (i.e., 1.0.0.1 to 254.254.255.255) as well as non-unique private network address. Obviously, a flexible address translation system of this invention cannot pretend to be a gateway to the entire Internet. In addition, systems of this invention must act as though they are part of the home network of any visiting node. A system must convince a visiting node that it is part of the node's home network. This is particularly challenging, as the system must contend with the myriad of home network settings configured on nodes. A typical statically configured node has configured a MAC address, an IP address, a default gateway IP address, a sub-network mask, and a default name server's IP address. The default gateway IP address specifies a particular router on the home network through which the visiting node expects to send its Internet traffic. The default name server is a machine on the home network that the node is configured to consult for DNS requests.

Figure 4:
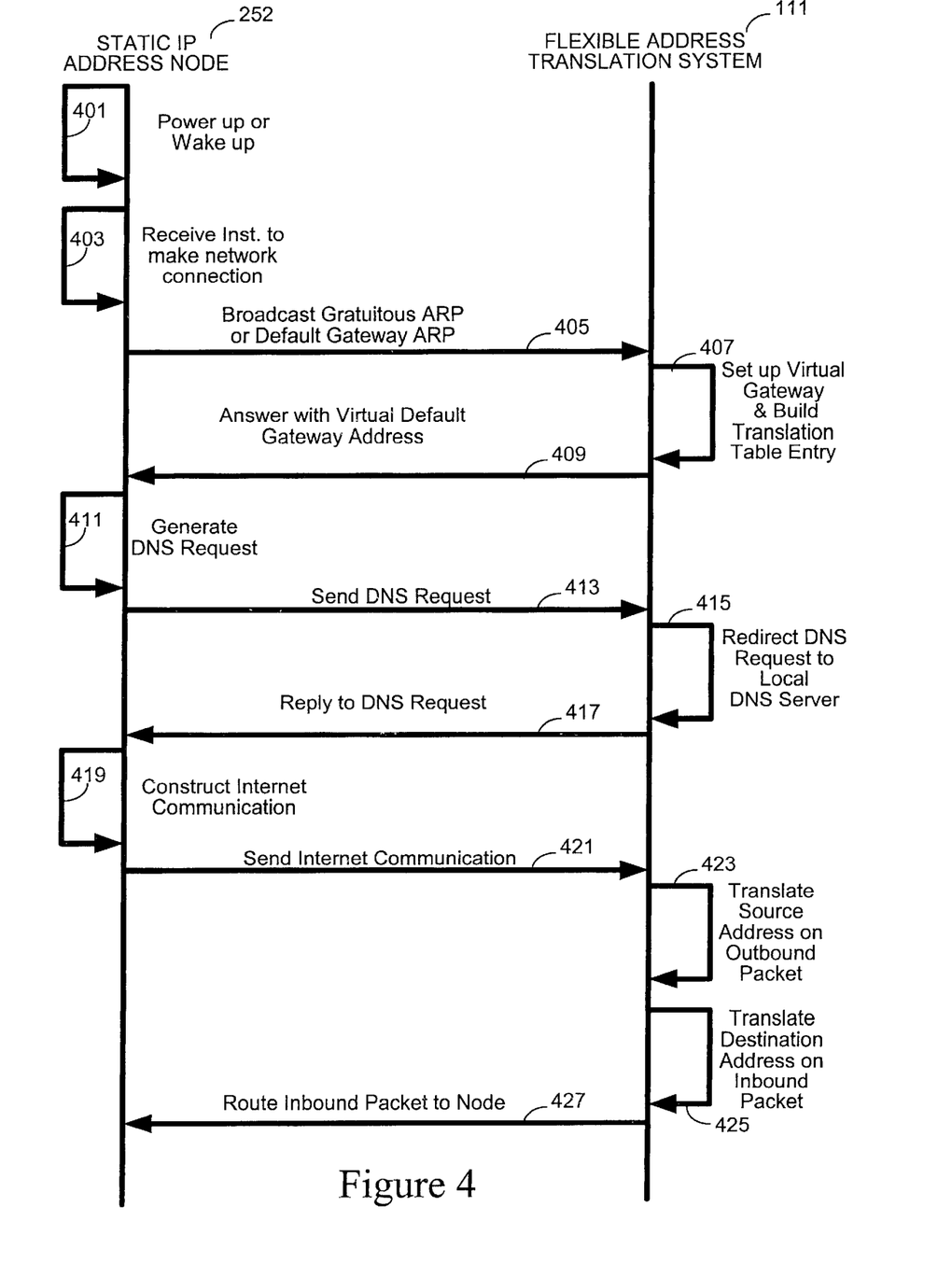
FIG. 4 is an interaction diagram illustrating how an address translation system of this invention may operate.

FIG. 4 is an interaction diagram showing how a visiting node 252 may interact with a flexible address translation system 111 to permit Internet communication via a remote network. In this figure, the actions of visiting node 252 are depicted along a vertical line on the left side and the actions of system 111 are depicted along a vertical line on the right side.

Initially, as indicated at 401 in FIG. 4, the visiting node powers up or wakes up. Next it receives instructions (403) to make a network connection. For example, the user may wish to check her e-mail via an e-mail application running on node 252. Such application sends the instructions received at 403. A typical node may then take various actions. For example, it may send out a "gratuitous ARP" (a packet formatted in accordance with the Address Resolution Protocol) or a "default gateway ARP." As shown in the example of FIG. 4, visiting node 252 broadcasts (405) a gratuitous ARP or a default gateway ARP on the remote network. In response, system 111 recognizes that it must act as a gateway for visiting node 252 and therefore sets up a virtual gateway (407). The way that system 111 responds to such ARPs determines, in part, the properties of the virtual default gateway.

The flexible address translation systems of this invention preferably detect but do not respond to gratuitous ARPs from visiting nodes. Note that a gratuitous ARP packet is sent to determine whether any other node on a system has the same IP address as the sender. In other words, it detects duplicate static configurations. If so, the conflict must be resolved so that only one node has the IP address of the gratuitous ARP.

Further, address translation systems of this invention preferably detect and respond to default gateway ARPs in a manner allowing visiting nodes to assume that their configured default gateway (from a home network) will route their Internet communications. In conventional IP, a default gateway ARP serves to identify the MAC address of the default gateway (usually the nearest router on the home network) to be used by the node sending the default gateway ARP.

A default gateway ARP conventionally includes four items: (1) a source MAC address, (2) a source IP address, (3) a destination IP address, and (4) a destination MAC address. The source MAC address and source IP address are the MAC and IP addresses of the node sending the default gateway ARP. The destination IP address is the IP address of the default gateway configured on the sending node. This should be the default gateway of the node's home network or network segment. The destination MAC address is a conventional "broadcast" MAC address. This indicates that the ARP is sent to all nodes on the current network.

A recipient node having the destination IP address and the capability of acting as a gateway should reply to a gateway ARP packet with a packet of its own. That reply packet conventionally includes the four items in the default gateway ARP packet. In this case, however, the destination MAC and IP addresses are the MAC and IP addresses of the node that sent the default gateway ARP. Further, the source MAC and IP addresses are the MAC and IP addresses of the recipient default gateway. When the node that originally sent the ARP receives a reply, it knows that a functioning default gateway exists and it knows the MAC address of that gateway. Subsequent communications from the node will include the MAC address of the reply packet.

Conventionally, a router that does not have the destination IP address of the default gateway ARP packet drops that packet without replying. This will lead the node sending the ARP to conclude that its connection to the Internet is unavailable. Without a special configuration, a gateway on a remote network visited by a visiting node will fail to reply to a default gateway ARP from the visiting node. This will prevent the visiting node from communicating via the remote network.

Figure 5:
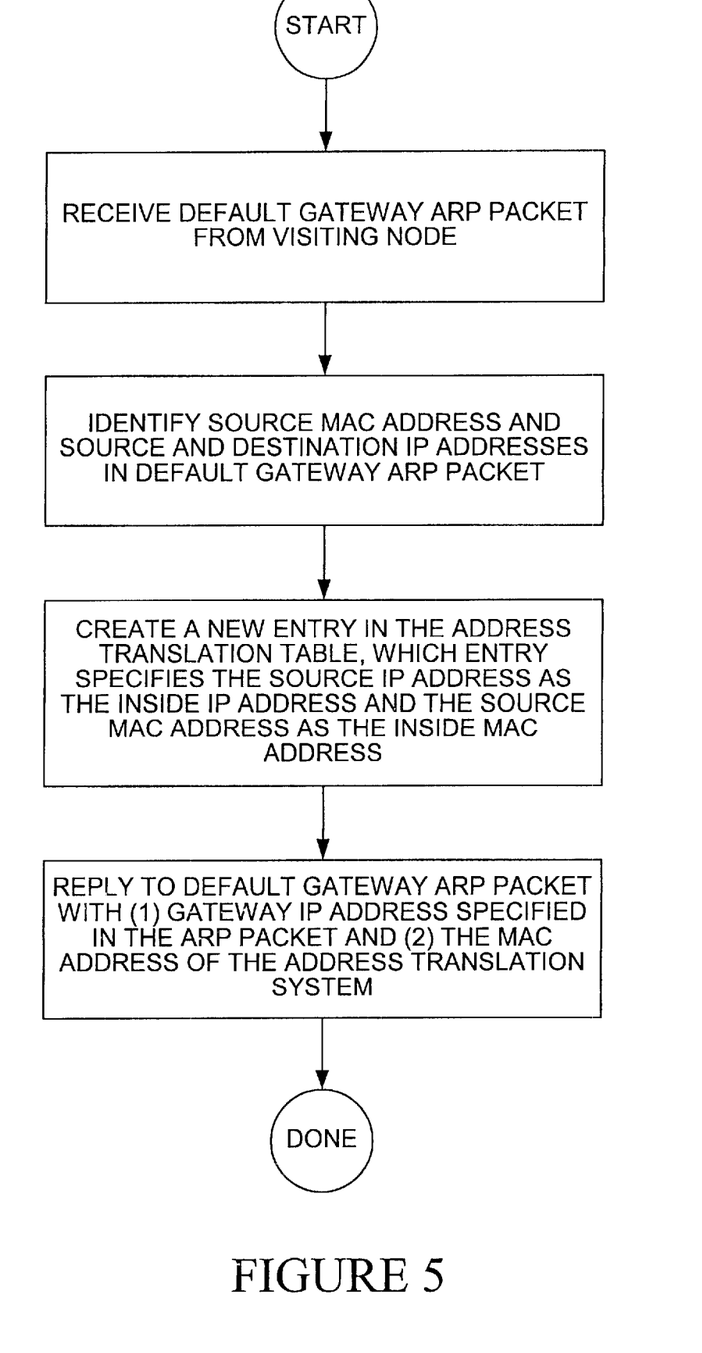
FIG. 5 is a flow chart showing how an address translation system o f this invention may handle a default gateway ARP from a visiting node.

As illustrated in FIGS. 4 and 5, the address translation system of this invention takes a contrary approach. Specifically, address translation system 111 may reply to a visiting node's default gateway ARP with a virtual default gateway address (409). Before that, however, it may also create a translation table entry for visiting node (407). The actions at 407 and 409 are further detailed in FIG. 5.

As shown there, when system 111 receives a default gateway ARP from a visiting node (503), it sets up a virtual gateway that appears to be the default gateway of the node. Specifically, it notes the default gateway IP address on the default gateway ARP (505). The address translation system also notes the source (i.e., visiting node) MAC and IP addresses on the ARP packet and creates a new entry for the translation table (507) or the multiple tables that act as a translation table. That entry includes the visiting node addresses.

As illustrated in FIG. 3, the entries of a translation table may include "inside" and "outside" addresses. Whether an address is inside or outside is determined from the perspective of the address translation system. Inside addresses are for entities on the local network side of the system and outside addresses are for entities on the Internet or WAN side of the system.

As illustrated, an address translation entry has an "Inside IP Address." This is the IP address of the visiting node (or any other locally attached node handled by the address translation system). Next, the entries have an "Inside MAC Address" for the source; the source being the visiting node. This is then the MAC address of the machine that is the visiting node. Next, the entries include a second Inside MAC Address, this time for the destination. The MAC level destination of the visiting node is its default gateway. As the translation system acts as the node's virtual gateway, the destination Inside MAC Address is the inside MAC address of the translation system. Note that the translation system typically has at least inside and outside interfaces, each configured with its own MAC address.

Each translation table entry will also include a Destination IP Address. This is the IP address of the corresponding node with which the visiting node wishes to communicate via the Internet or WAN. Conventionally, the Destination IP Address is associated with a range of addresses in the network device's routing table.

The outside addresses for each translation table entry include an "Outside IP Address," an "Outside MAC Address" for the source, and an "Outside MAC Address" for the destination. The Outside IP Address is the globally unique IP address assigned to the visiting node by the translation system. It is effectively the temporary Internet address of the visiting node while communicating with the corresponding node. The Outside MAC Address of the source (the address translation system now) is the MAC address of the translation system on its physical interface to the outside world (the Internet or a WAN). This might conventionally be provided in a routing table. Finally, the Outside MAC Address (destination) is the MAC address of the default gateway for the translation system. This might conventionally be provided in an ARP table. In the example of FIG. 2A, this would be the MAC address on an interface of router 240.

In addition to creating a translation table entry—upon receipt of the default gateway ARP—the address translation system also sends a default gateway ARP reply (509) in which it uses the default gateway IP address, thereby confirming that it can route the visiting node's Internet traffic. In the reply it uses its own MAC address. Subsequent packets including the default gateway MAC address are routed by the address translation system in accordance with the procedures of this invention. Thus, the translation system has effectively constructed a virtual gateway that appears to the visiting node to be that node's home gateway.

As noted above, a statically configured node may include an IP address for a default name server. Such servers often reside in the visiting node's home network and are given private addresses. As private addresses are unknown to the Internet, a DNS request to such name server could not find its way from the remote network to the home network. And even if the default name server has a globally unique public address, the server may reside behind a firewall in the home network. Thus, DNS requests to that server would be dropped by the home network's firewall. In short, when the visiting node is connected to the remote network, it likely cannot access its statically configured name server.

To address this potential problem, system 111 may also be configured to handle DNS requests from visiting nodes. It may, for example, translate or redirect DNS requests to a local name server. This procedure may be handled as depicted in FIG. 4. Initially, the visiting node determines that it wishes to communicate with a particular correspondent node. As part of the conventional procedure, it formulates a DNS request at 411. It then sends that request to its default gateway (address translation system 111) at 413. System 111 then handles the DNS request (415) as if it was the home name server for node 252 (even though it may not have the address specified in the DNS request). To accomplish this, system 111 must first recognize that the packet is a DNS request. This can usually be determined by an inspection of the packet header that specifies a destination port for DNS. With a DNS request packet in hand, system 111 may forward the request to its own name server (e.g., a name server to which the remote network's nodes are configured to submit DNS requests). This can be accomplished by swapping the destination IP address on the DNS request packet(s) with the IP address of the local name server.

Upon receipt of the DNS reply from the local name server, translation system 111 forwards that reply back to visiting node 252 as indicated at 417. However, translation system 111 may first replace the source IP address for the DNS reply with the visiting node's configured name server IP address. Such address may be stored in a table with the other address translation information. Node 252 now has the IP address (and any other pertinent DNS information) in hand and can construct packets for sending to that address.

At 419, node 252 constructs a communication (in the form of packets addressed to the destination IP address it has obtained). It then sends (421) the packets of that communication to the default gateway (system 111) by including the MAC address of that gateway in the packets. System 111 then translates the source IP address on the packets to the globally unique IP address currently associated with the visiting node. See 423. This may involve looking up the source IP address in the translation table. If an entry exists for that IP address, the corresponding global IP address is identified and applied to the packets as the source IP address. The system may also store the destination IP address in an address translation table entry. After switching in the global IP address, system 111 transmits the packets to the Internet. It may do this with the aid of the remote network's peripheral router. Alternatively, translation system 111 may, itself, serve as the peripheral router, in which case it handles the initial routing of the packet.

When translation system 111 receives packets at its outside interface, which packets are addressed to one of its global IP addresses, it consults translation table 115 to identify the corresponding entry and its inside IP address. The system then replaces the global IP address (destination address on in-bound packets) with the home IP address of the visiting node. See 425. The retooled packets are then sent to the visiting node. See 427.

Information associated with an address translation entry (such as the information provided in FIG. 3) may be cleared by various mechanisms. For example, a timeout period may expire, thereby causing the system to clear out some or all of the translation information. Alternatively, or in addition, a "clearing command" may be issued by a system administrator. Such command might be issued when a visiting node checks out, for example. Note that the information associated with address translation and the associated virtual gateway (represented in FIG. 3) may be stored in multiple tables. Each of these tables may have their own criteria for clearing information. Therefore, the information associated with an address translation may be removed from the system in parts and at different times.

Generally, an address translation method of this invention may be implemented on software and/or hardware. For example, it can be implemented in an operating system kernel, in a separate user process, in a library package bound into network applications, on a specially constructed machine, or on a network interface card. In a preferred embodiment of this invention, address translation is implemented in software such as an operating system or in an application running on an operating system.

A software or software/hardware hybrid address translation system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the address translation systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the address translation system may be implemented on a general-purpose network host machine such as a personal computer or workstation. Further, the invention may be at least partially implemented on a card (e.g., an interface card) for a network device or a general-purpose computing device.

Figure 6:
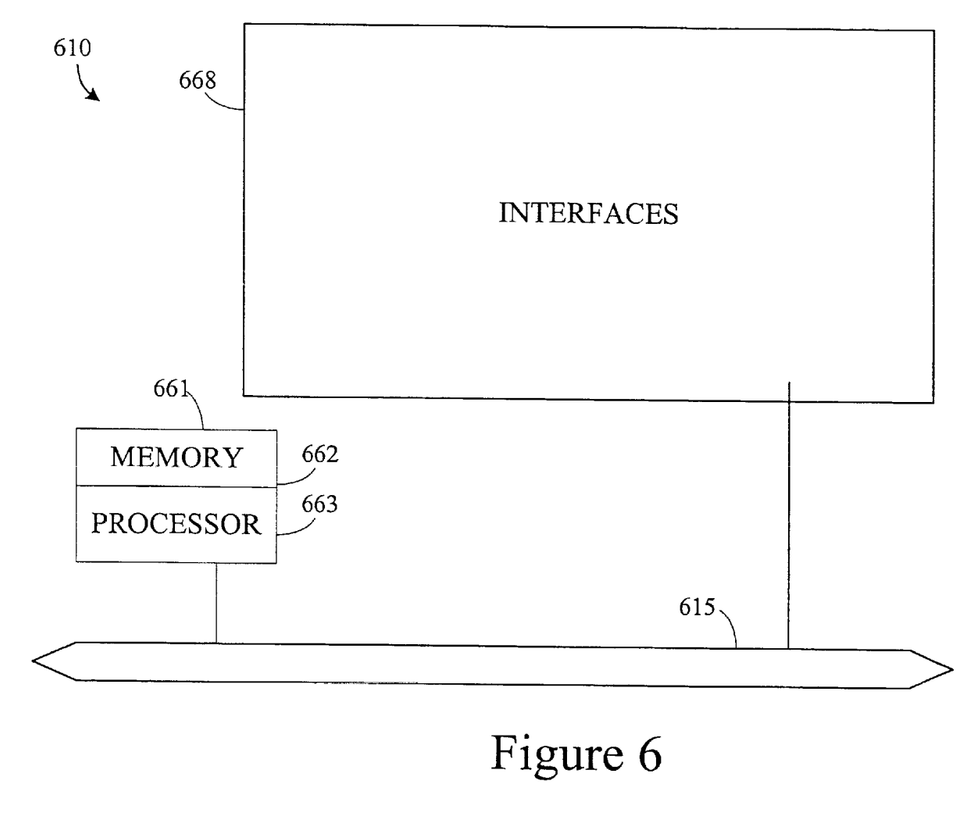
FIG. 6 is a diagram of router that may be used to implement certain embodiments of the present invention.

Referring now to FIG. 6, a router 610 suitable for implementing the present invention includes a master central processing unit (CPU) 662, interfaces 668, and a bus 615 (e.g., a PCI bus). When acting under the control of appropriate software or firmware, the CPU 662 is responsible for such router tasks as routing table computations and network management. It may also be responsible for network address translation, virtual gateway operations, etc. It preferably accomplishes all these functions under the control of software including an operating system (e.g., the Internet Operating System (IOS®) of Cisco Systems, Inc.) and any appropriate applications software. CPU 662 may include one or more processors 663 such as a processor from the Motorola family of microprocessors or the MIPS family of microprocessors. In an alternative embodiment, processor 663 is specially designed hardware for controlling the operations of router 610. In a preferred embodiment, a memory 661 (such as non-volatile RAM and/or ROM) also forms part of CPU 662. However, there are many different ways in which memory could be coupled to the system.

The interfaces 668 are typically provided as interface cards (sometimes referred to as "line cards"). Generally, they control the sending and receiving of data packets over the network and sometimes support other peripherals used with the router 610. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 662 to efficiently perform routing computations, network diagnostics, security functions, etc.

Although the system shown in FIG. 6 is one preferred router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 661) configured to store program instructions for the general-purpose network operations and address translation operations described herein. The program instructions may control the operation of an operating system and/or one or more applications, for example. The memory or memories may also be configured to store relevant state information, data structures, etc., such as the address translation lists (e.g., tables) described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

EXAMPLE

Figure 7:
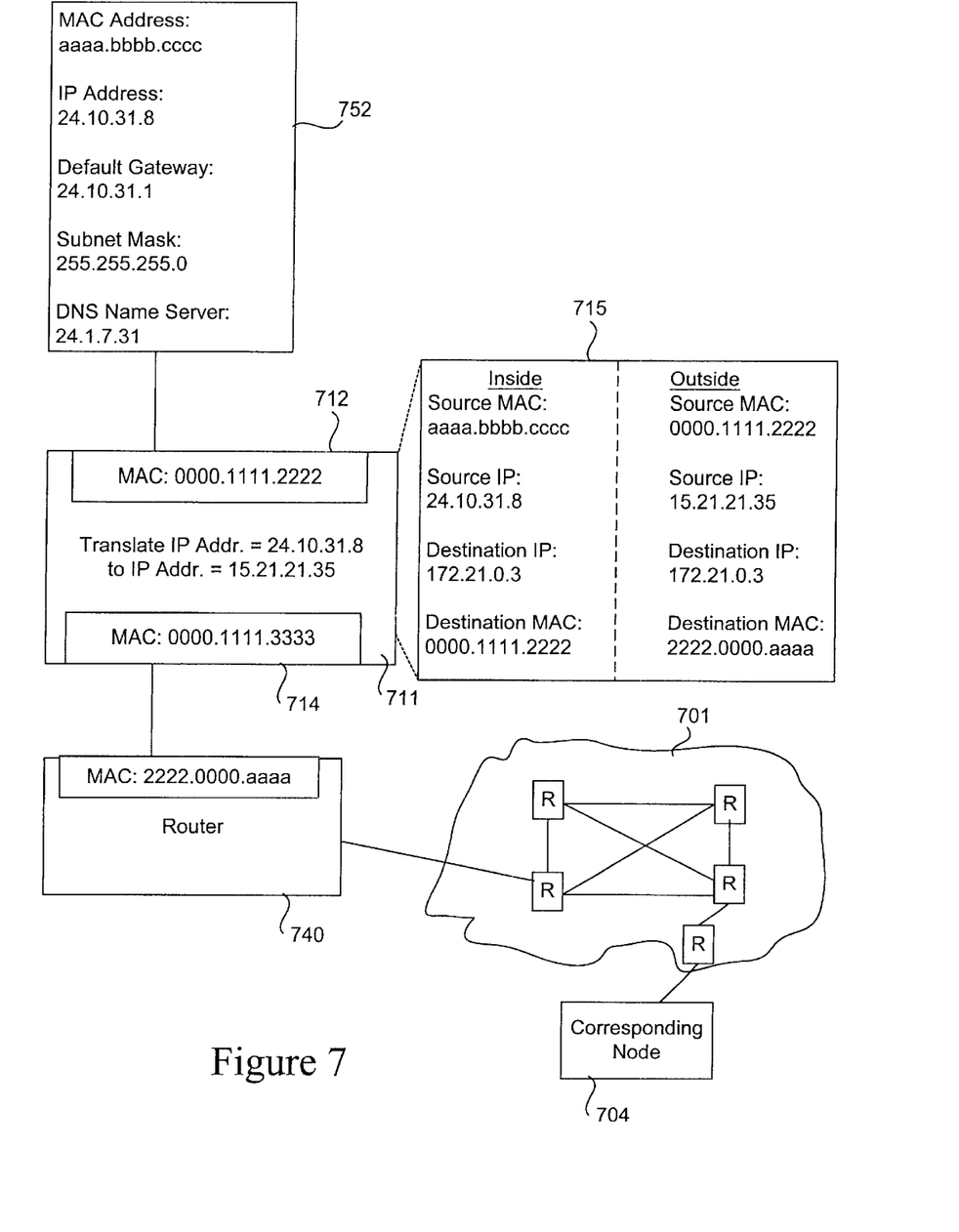
FIG. 7 is an illustration of an example in which a visiting node connects with a network implementing an embodiment of the present invention.

FIG. 7 presents an example of a flexible address translation operation in accordance with the present invention. In this example, a visiting node 752 is configured with the following default addresses:

| MAC Address | aaaa.bbbb.cccc |
| --- | --- |
| IP Address | 24.10.31.8 |
| Default Gateway | 24.10.31.1 |
| Subnet Mask | 255.255.255.0 |
| DNS Name Server | 24.1.7.31 |

Node 752 starts sending packets addressed to a corresponding node 704 on the Internet. Corresponding node 704 has an IP address of 172.21.0.3. Thus, the packets have a destination IP address of 172.21.0.3. They also have a source IP address of 24.10.31.8 (the IP address of visiting node 752). In addition, the packets have a destination MAC address of 0000.1111.2222. This is the inside interface MAC address of a network address translation system 711, acting as a virtual gateway and otherwise operating in accordance with this invention. Visiting node 752 may have previously obtained (and cached) the MAC address as identified in a reply to its default gateway ARP. Note that system 711, in its capacity as virtual gateway for node 752, acts as a machine having the IP address 24.10.31.1, which is the default gateway IP address configured on node 752.

Network address translation system 711 has two interfaces: an inside interface 712 and an outside interface 714. As mentioned interface 712 has a MAC address of 0000.1111.2222. Outside interface 714 has a separate MAC address of 0000.1111.3333. In addition, address translation system 711 maintains an address translation table 715 shown with one entry for visiting node 752.

As illustrated, the entry in table 715 includes the following inside addresses. First, it includes a source MAC address of aaaa.bbbb.cccc. This is the MAC address of the physical machine that is visiting node 752. Second, it includes a source IP address of 24.10.31.8, which is the IP address configured on node 752. Next, it includes a destination IP address of 172.21.03, which is the IP address of corresponding node 704, with which node 752 wishes to communicate. Finally, the inside address component includes a destination MAC address of 0000.1111.2222, which is the inside interface MAC address for translation system 711.

Address translation table 715 also includes the following outside addresses for the illustrated entry. First, it includes a source MAC address of 0000.1111.3333. This is the MAC address of the outside interface 714 of system 711. Next, it includes a source IP address of 15.21.21.35, which is the outside IP address that system 711 selected for node 752 from its pool of outside addresses. Next, it includes a destination IP address of 172.21.0.3, which is again the IP address of corresponding node 704. Finally, the outside address component of table 715 includes a destination MAC address of 2222.0000.aaaa, which is the MAC address of the default gateway for system 711.

Note that the default gateway of translation system 711 is a router 740 having an interface with MAC address 2222.0000.aaaa. Router 740 may correspond to router 240 in FIG. 2A for example. It routes packets from system 711 toward destinations on Internet 701. In this case, the packets are routed toward 704.

Before sending its packets to router 740, translation system 711 will replace inside source IP address 24.10.31.8 (statically configured in node 752) with outside source IP address 15.21.21.35 (from the pool of available globally unique outside IP addresses). Similarly, when translation system 711 receives packets having a destination IP address of 15.21.21.35, it replaces that address with 24.10.31.8 and sends the packet onto its network for receipt by node 752.

If translation system 711 should receive a packet having the port number for DNS, it must follow a slightly different set of rules. Frequently, the name server IP Address configured on a visiting node (24.1.7.31 for node 752) will be inaccessible. Thus, system 711 will shunt DNS requests to its local name server. It may accomplish this by swapping out the destination IP address on such request packets with the IP address of its own local name server. The DNS request then goes to the local name server (which is accessible) for handling. The DNS reply from the local name server may return to node 752 through translation system 711, which can replace the source IP address on the reply with the visiting node's configured name server IP address (24.1.7.31 in this example).

Although the foregoing invention has been described in some detail for purposes of clarity of understanding, it will be apparent that certain changes and modifications may be practiced within the scope of the appended claims.

What is claimed is:

1. A method of providing network connections for visiting nodes at a remote network, the visiting nodes being configured to connect through a home network that is remote from the remote network, the method comprising:

establishing a virtual gateway on the remote network for a visiting node by responding to a message from the visiting node addressed to a default gateway on the home network of the visiting node, which virtual gateway behaves as the home default gateway for the visiting node; and in a packet received at the virtual gateway, switching a home IP address of the visiting node with a globally unique outside address provided by the remote network.

2. The method of claim 1, wherein establishing the virtual gateway comprises sending a default gateway packet to the visiting node, the default gateway packet indicating that the remote network can handle Internet traffic from the visiting node.

3. The method of claim 2, wherein the default gateway packet identifies a gateway node on the remote network that is configured to act as virtual gateway.

4. The method of claim 2, wherein the default gateway packet is a reply to a default gateway ARP packet sent by the visiting node.

5. The method of claim 1, wherein switching the home IP address with a globally unique outside address takes place when the packet is sent from the visiting node, and wherein the source IP address of such packets is replaced with the globally unique outside address.

6. The method of claim 5, further comprising forwarding the packet to a destination on the Internet.

7. The method of claim 1, wherein switching the home IP address with a globally unique outside address takes place when the packet has the globally unique outside address as a destination IP address, and wherein the destination IP address of the packet is replaced with the home IP address of the visiting node.

8. The method of claim 1, further comprising creating a translation entry specifying the home IP address of the visiting node and the globally unique outside address.

9. The method of claim 8, wherein the address translation entry specifies a destination IP address for node on the Internet with which the visiting node communicates.

10. The method of claim 1, further comprising checking a list of translation entries to identify the home IP address of the visiting node and the globally unique outside address.

11. The method of claim 1, further comprising determining that the visiting node has made a Domain Name System request addressed to a home name server that is not on the remote network.

12. The method of claim 11, further comprising redirecting the Domain Name Service request to a remote name server to which the remote network is configured to submit Domain Name Service requests.

13. An apparatus configured to provide network connections for visiting nodes at a remote network, the visiting nodes being configured to connect through a home network that is remote from the remote network, the apparatus comprising:

one or more processors;

a memory in communication with at least one of the processors;

an address translation list including one or more translation entries, each specifying a home IP address of the visiting node and a globally unique outside address, wherein the globally unique outside address is provided by the remote network and the home IP address is the IP address of the visiting node on its home network, and wherein at least one of the processors and the memory is configured or designed to act as a virtual gateway on the remote network for a visiting node, which virtual gateway behaves as the home default gateway for the visiting node by responding to a message from the visiting node addressed to a default gateway on the home network of the visiting node.

14. The apparatus of claim 13, wherein the virtual gateway sends a default gateway packet to the visiting node, which default gateway packet indicating that the remote network can handle Internet traffic from the visiting node.

15. The apparatus of claim 14, wherein the default gateway packet identifies a gateway node on the remote network that is configured to act as virtual gateway.

16. The apparatus of claim 14, wherein the default gateway packet is a reply to a default gateway ARP packet sent by the visiting node.

17. The apparatus of claim 13, wherein an address translation entry specifies a destination IP address for node on the Internet with which the visiting node communicates.

18. The apparatus of claim 13, wherein at least one of the processor is configured or designed to determine the visiting node has made a Domain Name System request addressed to a home name server that is not on the remote network; and then redirect the Domain Name Service request to a remote name server to which the remote network is configured to submit Domain Name Service requests.

19. The apparatus of claim 13, wherein the apparatus is a network device.

20. The apparatus of claim 13, wherein the apparatus is a router.

21. The apparatus of claim 13, further comprising an operating system that configures the apparatus to act as the virtual gateway.

22. The apparatus of claim 13, further comprising an operating system that configures the apparatus to perform address translation by switching the globally unique outside address and the home IP address on packets to and from the visiting node.

23. A computer program product comprising:

(a) a machine readable medium; and (b) program instructions contained in the machine readable medium, the program instructions specifying a method for providing network connections for visiting nodes at a remote network, the visiting nodes being configured to connect through a home network that is remote from the remote network, the method comprising:

establishing a virtual gateway on the remote network for a visiting node by responding to a message from the visiting node addressed to a default gateway on the home network of the visiting node, which virtual gateway behaves as the home default gateway for the visiting node; and in a packet received at the virtual gateway, switching a home IP address of the visiting node with a globally unique outside address provided by the remote network.

24. The computer program product of claim 23, wherein establishing the virtual gateway comprises sending a default gateway packet to the visiting node, the default gateway packet indicating that the remote network can handle Internet traffic from the visiting node, and wherein the default gateway packet is a reply to a default gateway ARP packet sent by the visiting node.

25. The computer program product of claim 23, wherein switching the home IP address with a globally unique outside address takes place when the packet is sent from the visiting node, and wherein the source IP address of such packets is replaced with the globally unique outside address.

26. The computer program product of claim 23, wherein switching the home IP address with a globally unique outside address takes place when the packet has the globally unique outside address as a destination IP address, and wherein the destination IP address of the packet is replaced with the home IP address of the visiting node.

27. The computer program product of claim 23, further comprising program instructions for creating a translation entry specifying the home IP address of the visiting node and the globally unique outside address.

28. The computer program product of claim 23, further comprising program instructions for checking a list of translation entries to identify the home IP address of the visiting node and the globally unique outside address.

29. The computer program product of claim 23, further comprising program instructions for determining that the visiting node has made a Domain Name System request addressed to a home name server that is not on the remote network; and redirecting the Domain Name Service request to a remote name server to which the remote network is configured to submit Domain Name Service requests.

* * * * *